US008448956B2

(12) United States Patent
Wise

(10) Patent No.: US 8,448,956 B2
(45) **Date of Patent: *May 28, 2013**

(54) UNIVERSAL MOBILE SAW STAND

(76) Inventor: Robert W. Wise, Petaluma, CA (US)

(*) Notice: Subject to any disclaimer, the term of this patent is extended or adjusted under 35 U.S.C. 154(b) by 387 days.

This patent is subject to a terminal disclaimer.

(21) Appl. No.: 12/653,636

(22) Filed: Dec. 14, 2009

(65) Prior Publication Data

US 2010/0171290 A1 Jul. 8, 2010

Related U.S. Application Data

(63) Continuation of application No. 10/391,540, filed on Mar. 17, 2003, now Pat. No. 7,648,155, and a continuation of application No. 09/795,032, filed on Feb. 26, 2001, now abandoned.

(60) Provisional application No. 60/186,555, filed on Mar. 2, 2000.

(51) Int. Cl.
*B62B 1/04* (2006.01)

(52) U.S. Cl.
USPC ............................ 280/30; 280/47.18; 280/641

(58) Field of Classification Search
USPC ............. 280/30, 35, 639, 649, 651, 652, 654, 280/43.1, 43.11, 47.131, 47.17, 47.18, 47.23, 280/47.24, 47.27, 47.28; 144/253.8, 286.1, 144/287; 83/157, 471; 269/17
See application file for complete search history.

(56) References Cited

U.S. PATENT DOCUMENTS

| | | | | |
|---|---|---|---|---|
| 2,662,566 | A | 12/1953 | Kurschner | |
| 3,008,463 | A | 11/1961 | Frank | |
| 3,669,031 | A * | 6/1972 | Cole | 108/102 |
| D252,197 | S | 6/1979 | Gale | |
| 4,230,329 | A | 10/1980 | Johnson | |
| 4,284,286 | A * | 8/1981 | Lewallen | 280/30 |
| 4,373,761 | A | 2/1983 | Hansberry, Jr. | |
| 4,483,573 | A | 11/1984 | Keller | |
| 4,565,382 | A | 1/1986 | Sherman | |
| 4,611,823 | A * | 9/1986 | Haas | 280/641 |
| 4,726,405 | A * | 2/1988 | Bassett | 144/287 |
| 4,934,718 | A * | 6/1990 | Voegele | 280/30 |
| 4,955,450 | A | 9/1990 | Deinlein-Kalb | |
| 4,967,450 | A | 11/1990 | Adkins et al. | |
| 4,969,496 | A * | 11/1990 | Romans | 144/286.1 |
| 5,005,847 | A | 4/1991 | King et al. | |
| 5,067,535 | A * | 11/1991 | Wolff | 144/286.1 |
| 5,087,013 | A * | 2/1992 | Gress et al. | 248/676 |
| 5,154,441 | A * | 10/1992 | White et al. | 280/645 |
| 5,161,590 | A | 11/1992 | Otto | |
| 5,193,598 | A | 3/1993 | Estrem | |
| 5,224,531 | A | 7/1993 | Blohm | |

(Continued)

FOREIGN PATENT DOCUMENTS

| | | |
|---|---|---|
| DE | 427500 | 4/1926 |
| EP | 0 532 132 A2 | 3/1993 |

(Continued)

*Primary Examiner* — Hau Phan
*Assistant Examiner* — Jacob Meyer
(74) *Attorney, Agent, or Firm* — Lowe Graham Jones PLLC

(57) ABSTRACT

This saw stand is a mobile unit, via a built-in hand truck design which enables the end user to transport common table saws and equipment to the location of the project being undertaken. The unit quickly folds out into a fully supporting work bench for actual use of the saw and/or equipment.

1 Claim, 7 Drawing Sheets

U.S. PATENT DOCUMENTS

| | | | | |
|---|---|---|---|---|
| 5,231,905 | A | 8/1993 | Trahan | |
| 5,255,724 | A | 10/1993 | Butke | |
| 5,269,545 | A | 12/1993 | Huebschen et al. | |
| 5,423,561 | A | 6/1995 | Sadow | |
| 5,642,898 | A | 7/1997 | Wise | |
| 5,863,052 | A | 1/1999 | Roman | |
| 5,957,472 | A * | 9/1999 | Borgatti | 280/30 |
| 6,152,462 | A * | 11/2000 | Barrett | 280/30 |
| 6,328,319 | B1 * | 12/2001 | Stahler, Sr. | 280/47.18 |
| 6,345,829 | B1 * | 2/2002 | Mueller | 280/47.18 |
| 6,530,583 | B1 * | 3/2003 | Mueller | 280/47.18 |
| 6,578,856 | B2 * | 6/2003 | Kahle | 280/30 |
| 6,886,836 | B1 * | 5/2005 | Wise | 280/30 |
| D523,041 | S * | 6/2006 | Wise | D15/141 |
| 7,213,829 | B2 * | 5/2007 | Wu | 280/645 |
| 7,222,865 | B2 * | 5/2007 | Chen et al. | 280/30 |
| 7,255,355 | B2 * | 8/2007 | Chisholm et al. | 280/30 |
| D566,735 | S * | 4/2008 | Wise | D15/141 |
| 7,481,142 | B2 * | 1/2009 | Kelly | 83/581 |
| 7,494,149 | B2 * | 2/2009 | Liu et al. | 280/639 |
| D594,042 | S * | 6/2009 | Wise | D15/141 |
| 7,648,155 | B1 * | 1/2010 | Wise | 280/639 |
| 7,731,205 | B2 * | 6/2010 | Wise | 280/47.131 |
| 7,819,111 | B2 * | 10/2010 | Wise | 125/13.01 |
| 2002/0125662 | A1 * | 9/2002 | Magness | 280/30 |
| 2006/0163441 | A1 * | 7/2006 | Wise | 248/637 |
| 2007/0197139 | A1 * | 8/2007 | Wise | 451/41 |
| 2009/0079152 | A1 * | 3/2009 | Wise | 280/47.24 |
| 2009/0211419 | A1 * | 8/2009 | Wise | 83/169 |

FOREIGN PATENT DOCUMENTS

| | | |
|---|---|---|
| FR | 1.577.810 | 8/1969 |
| GB | 2 048 754 | 12/1980 |
| GB | 2 069 915 | 9/1981 |
| JP | 2000 41304 | 5/2000 |

* cited by examiner

UNIVERSAL MOBILE SAW STAND

CROSS-REFERENCE TO RELATED APPLICATION

This utility patent application is a continuation of and claims the benefit of the filing date of and/or priority from non-provisional application Ser. No. 10/391,540, titled UNIVERSAL MOBILE SAW STAND, filed Mar. 17, 2003; now U.S. Pat. No. 7,648,155 and non-provisional application Ser. No. 09/795,032 having the same title filed Feb. 26, 2001, now abandoned and provisional patent application Ser. No. 60/186,555 entitled UNIVERSAL MOBILE SAW STAND filed Mar. 2, 2000.

TECHNICAL FIELD

The invention relates to mobile stands for tools. More specifically, the invention relates to mobile stands for power tools.

BACKGROUND OF THE INVENTION

Portable, wheeled tool carts have been available for some time. Once such prior art tool cart is shown and described by Wise, the inventor herein, in U.S. Pat. No. 5,642,898 issued Jul. 1, 1997. Additional tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw table apparatus. U.S. Pat. No. 5,255,724, issued Oct. 26, 1993, to Butke, describes an adjustable extension assembly. A brochure showing the Rousseau 552850 product discloses a mobile miter saw stand.

Nevertheless, a need exists for a mobile saw stand which enables an end user to transport common table saws and the like to the location of the project being undertaken wherein the mobile saw stand quickly folds out into a fully supporting work bench for actual use of the saw and or equipment.

A further need exists for a mobile stand unit which enables the unit to stand in a vertical position with the saw attached and also the ability to use the saw when attached to the mobile saw stand unit in a horizontal stored position for hardwood floor installers and the like.

SUMMARY OF THE INVENTION

It is therefore an object of the present invention to provide a mobile saw stand unit which enables an end user to transport common table saws and the like to the location of the project being undertaken wherein the mobile saw stand quickly folds out into a fully supporting work bench for actual use of the saw and or equipment.

It is a further object of the invention to achieve the above object in a mobile saw stand unit which enables the unit to stand in a vertical position with the saw attached.

It is yet another object of the invention to achieve the above objects in a mobile saw stand unit which has the feature of a user being able to use the saw when attached to the mobile saw stand unit in a horizontal stored position for hardwood floor installers and the like.

The invention achieves the above objects and other objects and advantages which will become apparent from the description which follows by providing a universal mobile saw stand.

In its preferred embodiment, this saw stand is a mobile unit, via a built-in hand truck design which enables the end user to transport common table saws and equipment to the location of the project being undertaken. The unit quickly folds out into a fully supporting work bench for actual use of the saw and/or equipment.

In its preferred embodiment, this saw stand has a built-in feature which enables the unit to stand in the vertical position with the saw attached. This creates ease in transporting the unit to and from the workplace, i.e., in elevators, truck beds, etc. Also built into the design is the ability to use the saw in the horizontal stored position for hardwood floor installers, etc.

In its preferred embodiment, this unit is constructed of powder coated tubular steel and sheet metal. Ergonomic handles and lockout devices are incorporated into each aspect of this unit for ease of use, safety and product longevity. Quick automatic latch mechanisms are an integral part of the unit for the flip out support leg and the saw table surface. These latches are automatic in the set up mode and require manual release for returning the unit to the stored position.

DETAILED DESCRIPTION OF THE PREFERRED EMBODIMENTS

Figure 1:
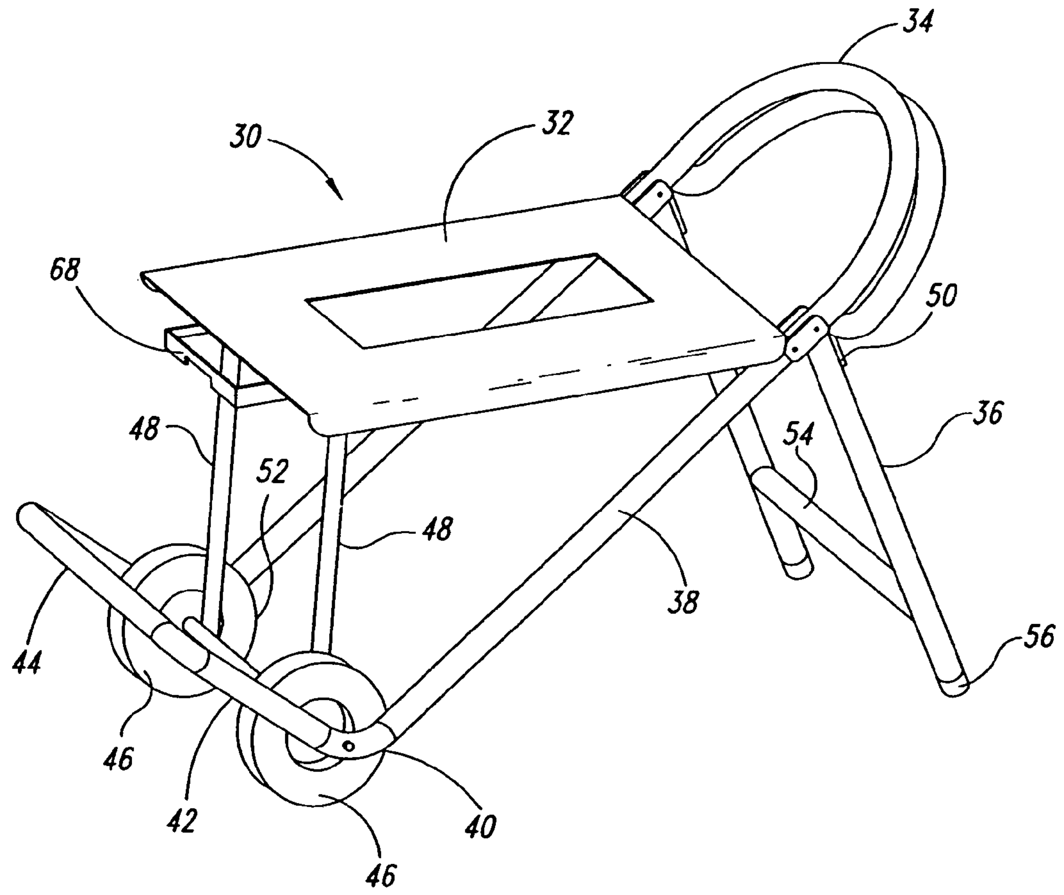
FIG. 1 is an isometric, environmental view of the mobile saw stand in an extended, raised position.
Figure 2:
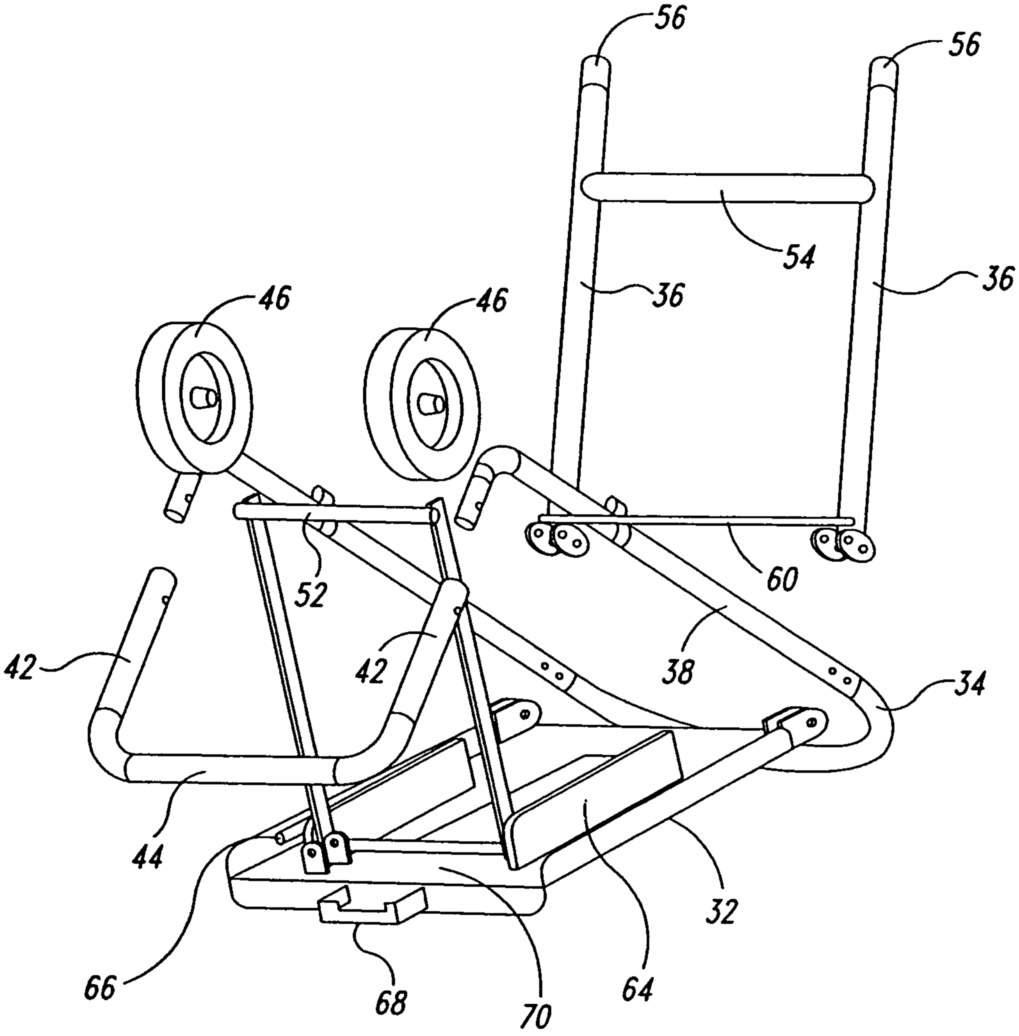
FIG. 2 is a front, exploded assembly diagram of the invention in an inverted position.
Figure 3:
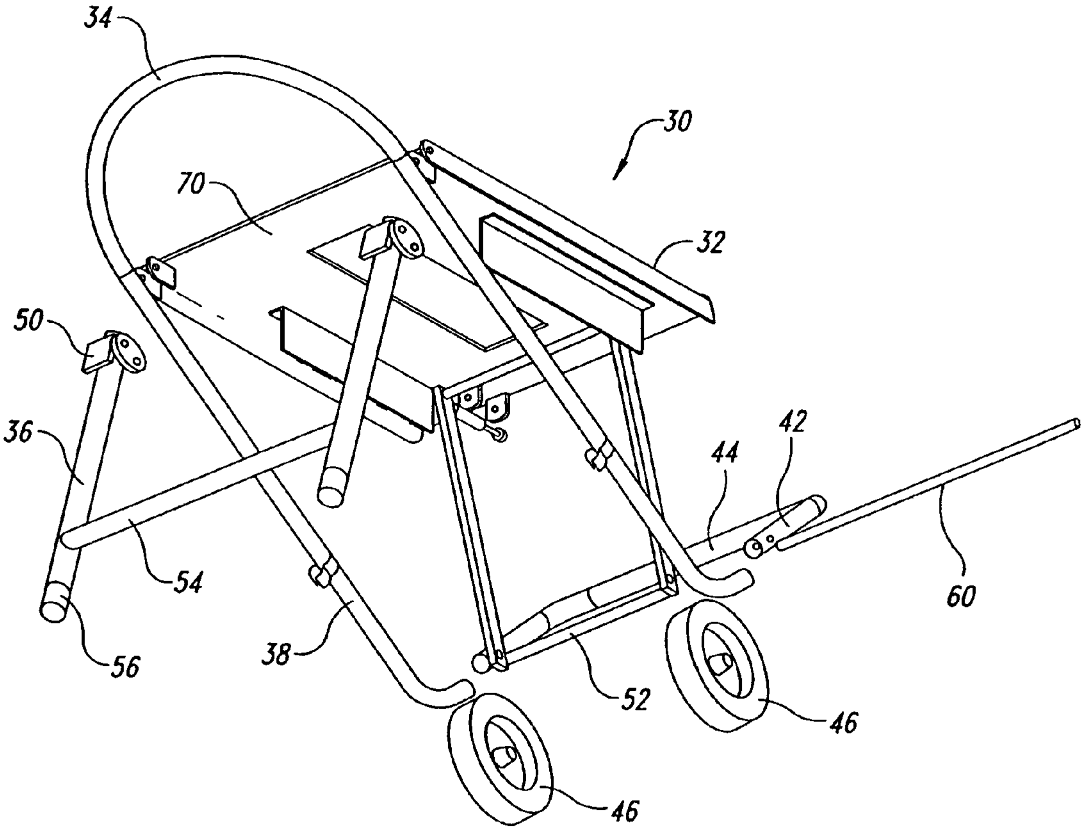
FIG. 3 is a rear, exploded assembly diagram of the invention in an inverted position.
Figure 4:
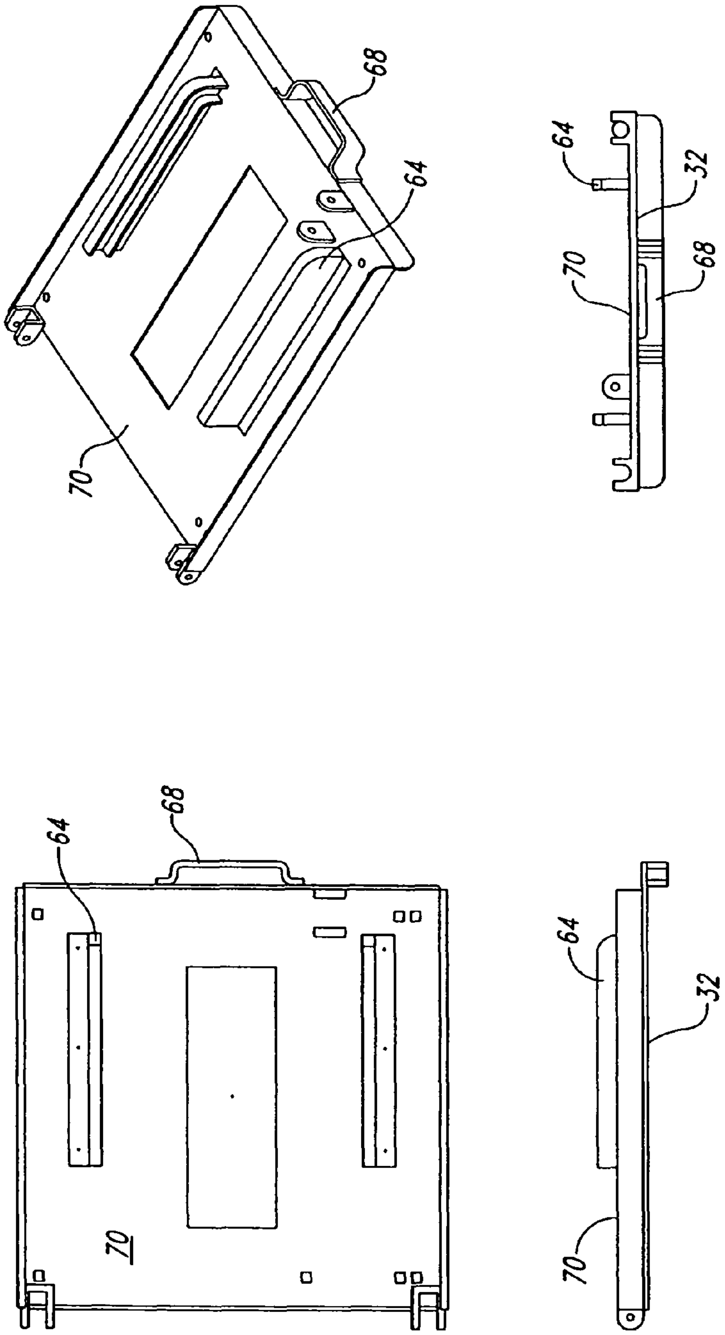
FIG. 4 is a composite, perspective environmental view of an underside of a bed of the present invention including three orthographic projections of the bed comprising a bottom plan view, a left-side elevational view, and a front elevational view.
Figure 5:
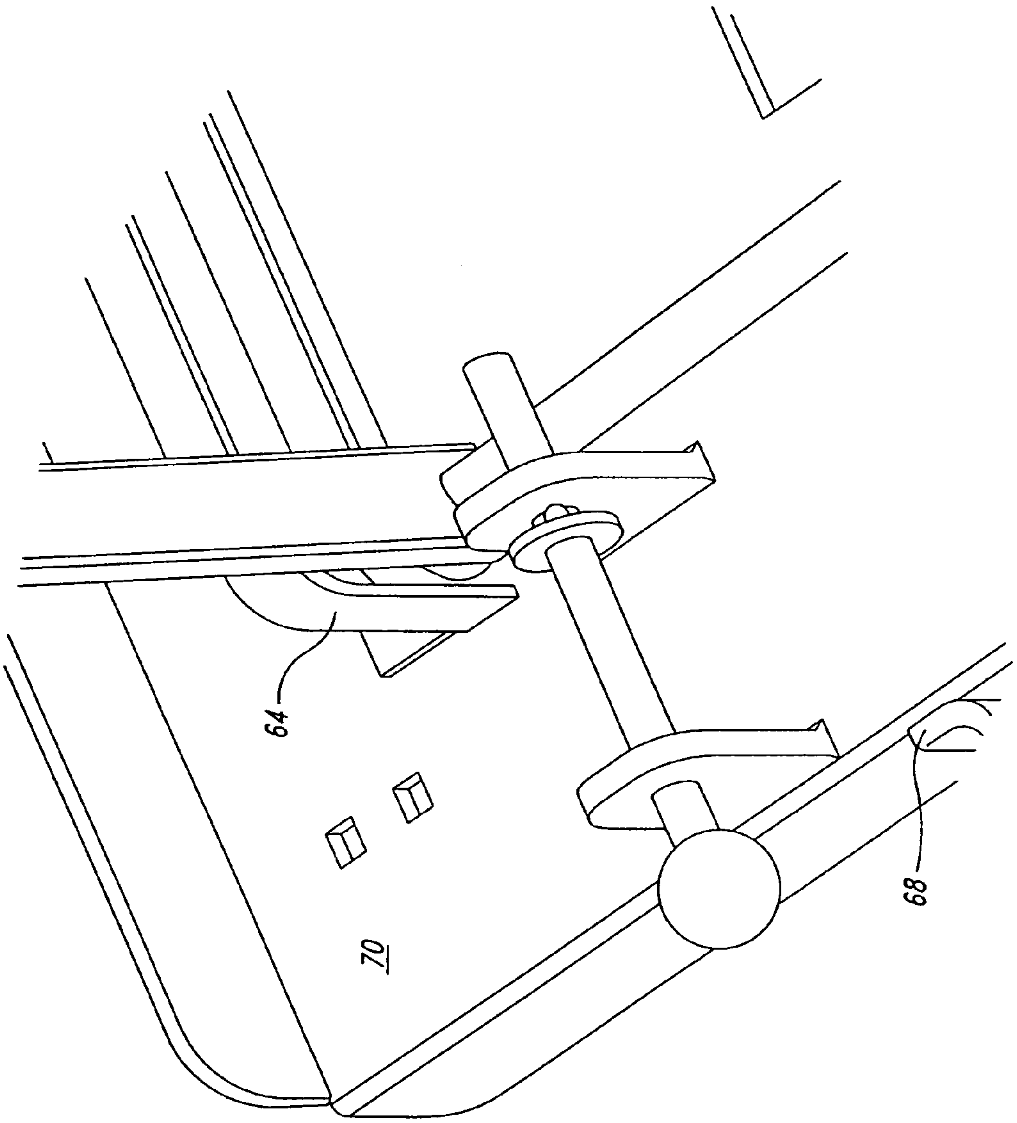
FIG. 5 is an enlarged, partial perspective view of a locking device for a movable bed support of the present invention.
Figure 6:
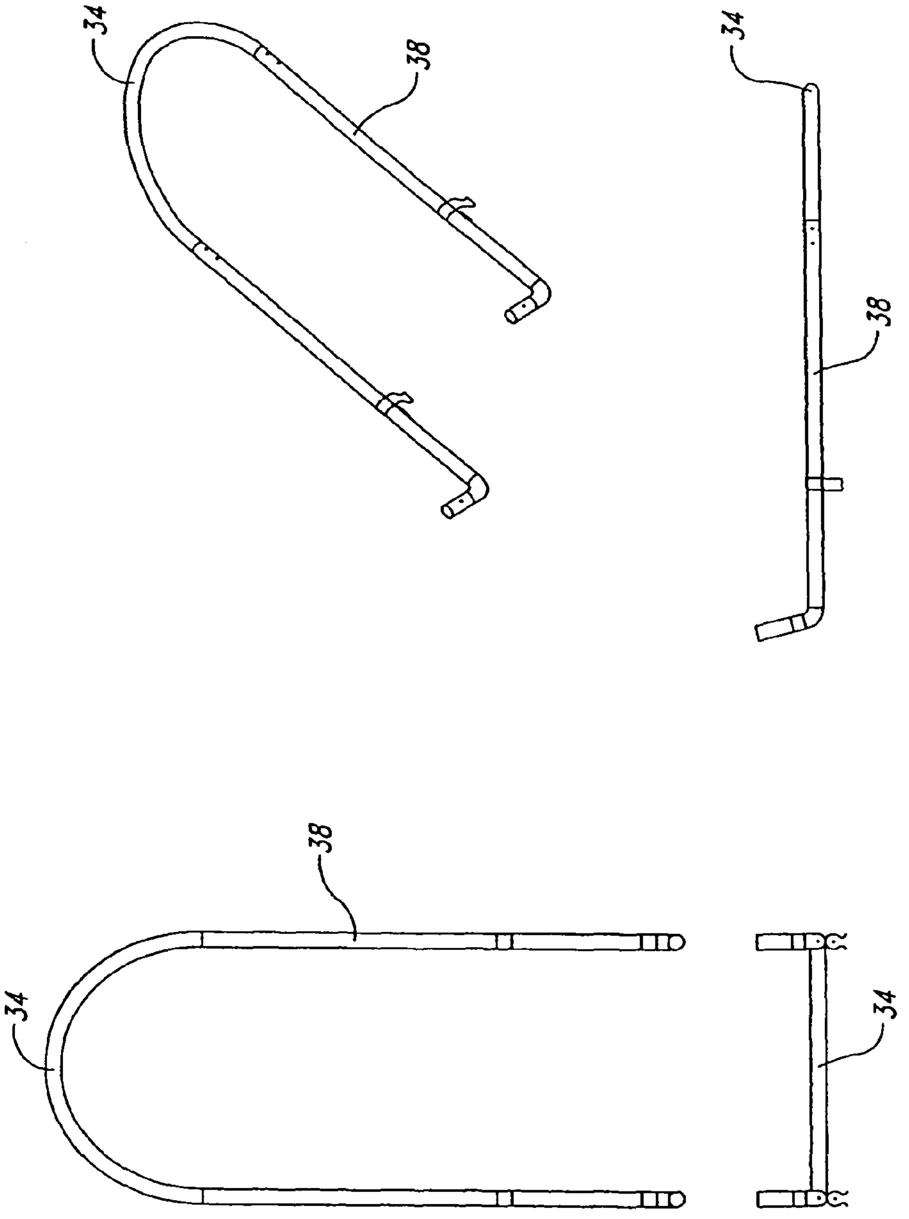
FIG. 6 is a composite view comprising a perspective view of a portion of a hand truck shaped main frame including three orthographic projections, a top plan view, an end view, and a side elevational view.
Figure 7:
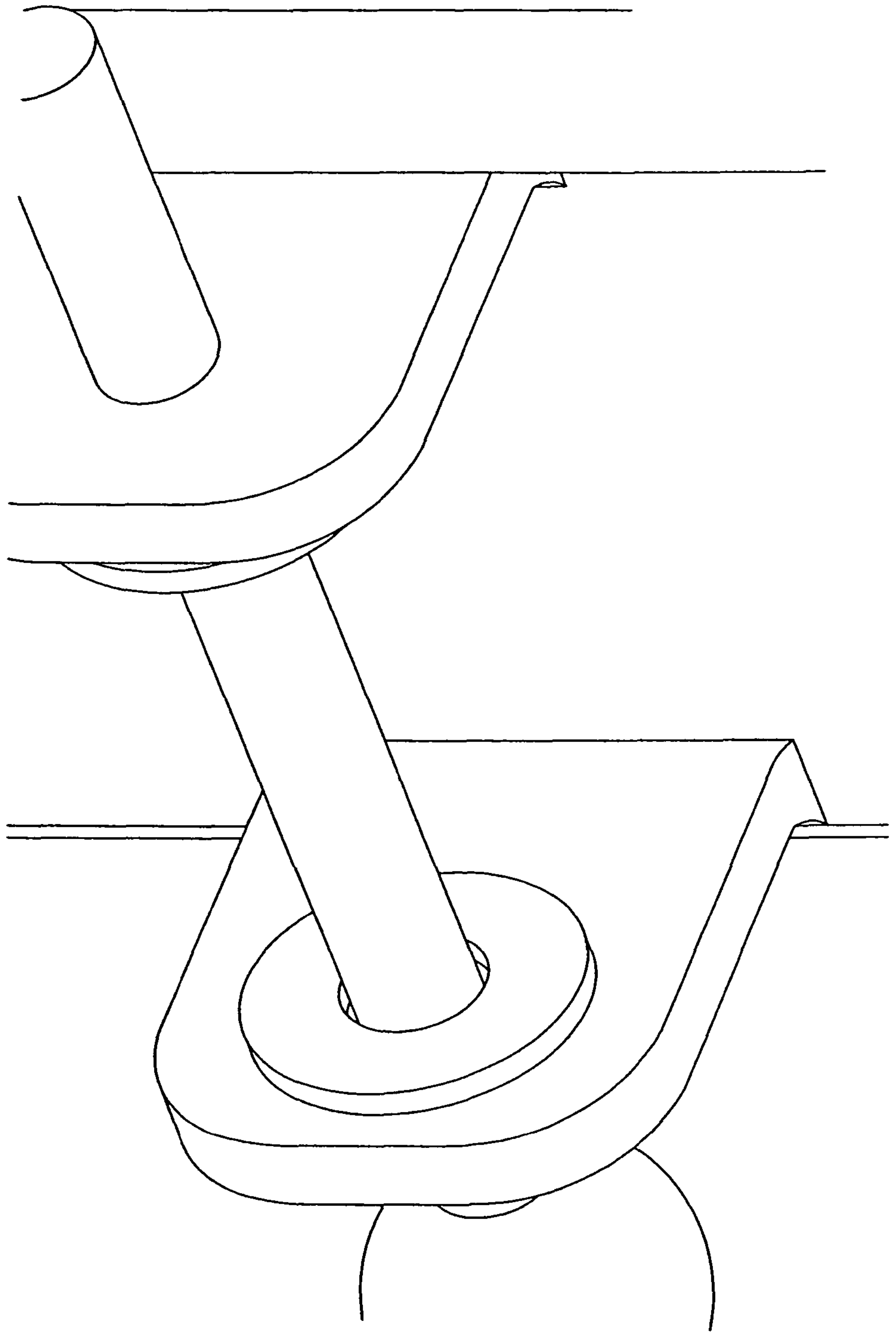
FIG. 7 is another enlarged partial perspective view of an automatic locking mechanism of the present invention.

This saw stand 30 shown in FIGS. 1 through 24 is a mobile unit, via a built-in hand truck design which enables the end user to transport common table saws (not shown) and equipment to the location of the project being undertaken. The unit quickly folds out into a fully supporting work bench for actual use of the saw and/or equipment.

This saw stand has a built-in feature which enables the unit to stand in the vertical position with the saw attached. This creates ease in transporting the unit to and from the workplace, i.e., in elevators, truck beds, etc. Also built into the design is the ability to use the saw in the horizontal stored position for hardwood floor installers, etc.

This unit is constructed of powder coated tubular steel and sheet metal. Ergonomic handles 34, 68 and lockout devices 66, 50 are incorporated into each aspect of this unit for ease of use, safety and product longevity. Quick automatic latch mechanisms 66, 50 are an integral part of the unit for the flip out support leg 36 and the saw table surface 32. These latches are automatic in the set up mode and require manual release for returning the unit to the stored position.

More specifically, the mobile saw stand, generally indicated at reference numeral 30 has a substantially hand-truck shaped main frame 38 having a handle portion 34 and a distal bottom end portion 40 including a pair of wheels 46 rotatably connected to the bottom end portion 40 for transporting the stand. The stand 30 further includes a pair of swing out legs 36 pivotally connected to the main frame 38 adjacent to the handle portion 34. The legs 36 are movable between a stowed position and a raised position with respect to the main frame 38. A bed 32 is pivotally connected to the main frame 38 adjacent to the handle portion 34 for removably receiving a table saw (not shown). The bed is movable between a stowed position and a raised position with respect to the main frame 38. A movable bed support consisting of members 48 for selectively supporting the bed in a raised position and in a stowed position with respect to the main frame 38 are provided. The bed support members 48 have each end pivotally connected to the main frame 38 at bend 40. Each member 48 has a distal end slidably connected to the bed 32 by track-like members 64 connected to the bed 32. In this way, the table saw is usable on the bed in either the raised or stowed position. The mobile saw stand 30 also includes an automatic locking mechanism 66 to secure the bed, the swing out legs 36, and the bed support members 48 in their respective raised positions with respect to the main frame 38. The mobile saw stand 30 is also preferably arranged such that the wheels 46 are rotatably connected to the bottom end portion 44 by an elongated axle 60 and wherein the one end of the movable bed support is pivotally connected to the main frame by being rotatably connected about the axle by means of a sleeve 52.

Those of ordinary skill in the art will conceive of other alternate embodiments of the invention upon reviewing this disclosure. Thus, the invention is not to be limited to the above description, but is to be determined in scope by the claims which follow.

I claim:

1. A mobile saw stand, comprising:

a main frame having an upper end portion including a handle portion adjacent thereto and a distal bottom end portion including a pair of wheels operably connected adjacent to the bottom end portion for transporting the stand;

a bed pivotally connected to the main frame adjacent to the upper end portion for removably receiving a powered saw, the bed being movable between a stowed position and a raised position with respect to the main frame;

a pair of swing out legs pivotally connected to the main frame adjacent to the handle portion, the legs being movable between a stowed position and a raised position with respect to the main frame; and a movable bed support for selectively supporting the bed in a raised position and in a stowed position with respect to the main frame, wherein the bed support has one end pivotally connected to the main frame and a distal end substantially, continuously slidably connected to the bed, whereby the powered saw is usable on the bed in either the raised or stowed position and wherein the one end of the movable bed support is pivotally connected to the main frame proximate the wheels.

* * * * *